United States Patent
Um et al.

(10) Patent No.: US 9,112,934 B2
(45) Date of Patent: Aug. 18, 2015

(54) APPARATUS AND METHOD FOR CONFIGURING ON-DEMAND CONTENT DELIVERING OVERLAY NETWORK

(75) Inventors: Tai-Won Um, Seoul (KR); Chang-Woo Yoon, Daejeon-si (KR); Kang-Woon Hong, Seoul (KR); Nam-Kyung Lee, Daejeon-si (KR); Hyun-Woo Lee, Daejeon-si (KR); Won Ryu, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 136 days.

(21) Appl. No.: 13/589,507

(22) Filed: Aug. 20, 2012

(65) Prior Publication Data
US 2013/0268983 A1    Oct. 10, 2013

(30) Foreign Application Priority Data
Apr. 5, 2012    (KR) .......................... 10-2012-0035676

(51) Int. Cl.
| H04N 7/173 | (2011.01) |
|---|---|
| H04L 29/06 | (2006.01) |
| H04N 21/2385 | (2011.01) |
| H04N 21/24 | (2011.01) |

(52) U.S. Cl.
CPC ............ *H04L 65/4084* (2013.01); *H04L 65/80* (2013.01); *H04N 21/2385* (2013.01); *H04N 21/2402* (2013.01)

(58) Field of Classification Search
CPC ........................ H04N 7/17318; H04N 7/16336
USPC .............................. 725/87–118; 709/217–232
See application file for complete search history.

(56) References Cited

U.S. PATENT DOCUMENTS

| 5,673,253 | A  * | 9/1997  | Shaffer ....................... 370/229 |
|---|---|---|---|
| 6,175,861 | B1 * | 1/2001  | Williams et al. .............. 709/217 |
| 6,202,211 | B1 * | 3/2001  | Williams, Jr. ................... 725/78 |
| 7,143,139 | B2 * | 11/2006 | Burbeck et al. ............... 709/206 |
| 7,447,796 | B2 * | 11/2008 | Forrester ....................... 709/238 |
| 7,926,079 | B2 * | 4/2011  | Lebar .............................. 725/90 |
| 8,327,436 | B2 * | 12/2012 | Randle et al. .................. 726/15 |
| 8,665,734 | B2 * | 3/2014  | Corson et al. ................. 370/252 |
| 2002/0154892 | A1 * | 10/2002 | Hoshen et al. .................. 386/87 |
| 2008/0175590 | A1 * | 7/2008  | Perkins et al. .................. 398/58 |
| 2009/0304380 | A1 * | 12/2009 | Sadananda et al. ............. 398/26 |
| 2010/0105332 | A1 * | 4/2010  | McHenry et al. ............... 455/62 |
| 2012/0096109 | A1 * | 4/2012  | Chan et al. .................... 709/213 |

FOREIGN PATENT DOCUMENTS

| KR | 1020100059638 A | 6/2010 |
|---|---|---|
| KR | 1020100090613 A | 8/2010 |

* cited by examiner

*Primary Examiner* — Annan Shang
(74) *Attorney, Agent, or Firm* — William Park & Associates Ltd.

(57) ABSTRACT

Provided are a method and apparatus for content delivery networking. There is provided a method of managing a content delivery network to transfer media content to a user, including: receiving a network configuration request and network configuration information, from a service provider that provides the content; receiving resource information including information about available resources required for configuring the network; and configuring a content delivery overlay network, based on the resource information and the network configuration information. Therefore, by configuring a content delivery overlay network for each provider, service and content providers having no unique content delivery method of their own can provide multimedia services based on applications for smart TV and web TV to a plurality of users.

12 Claims, 5 Drawing Sheets

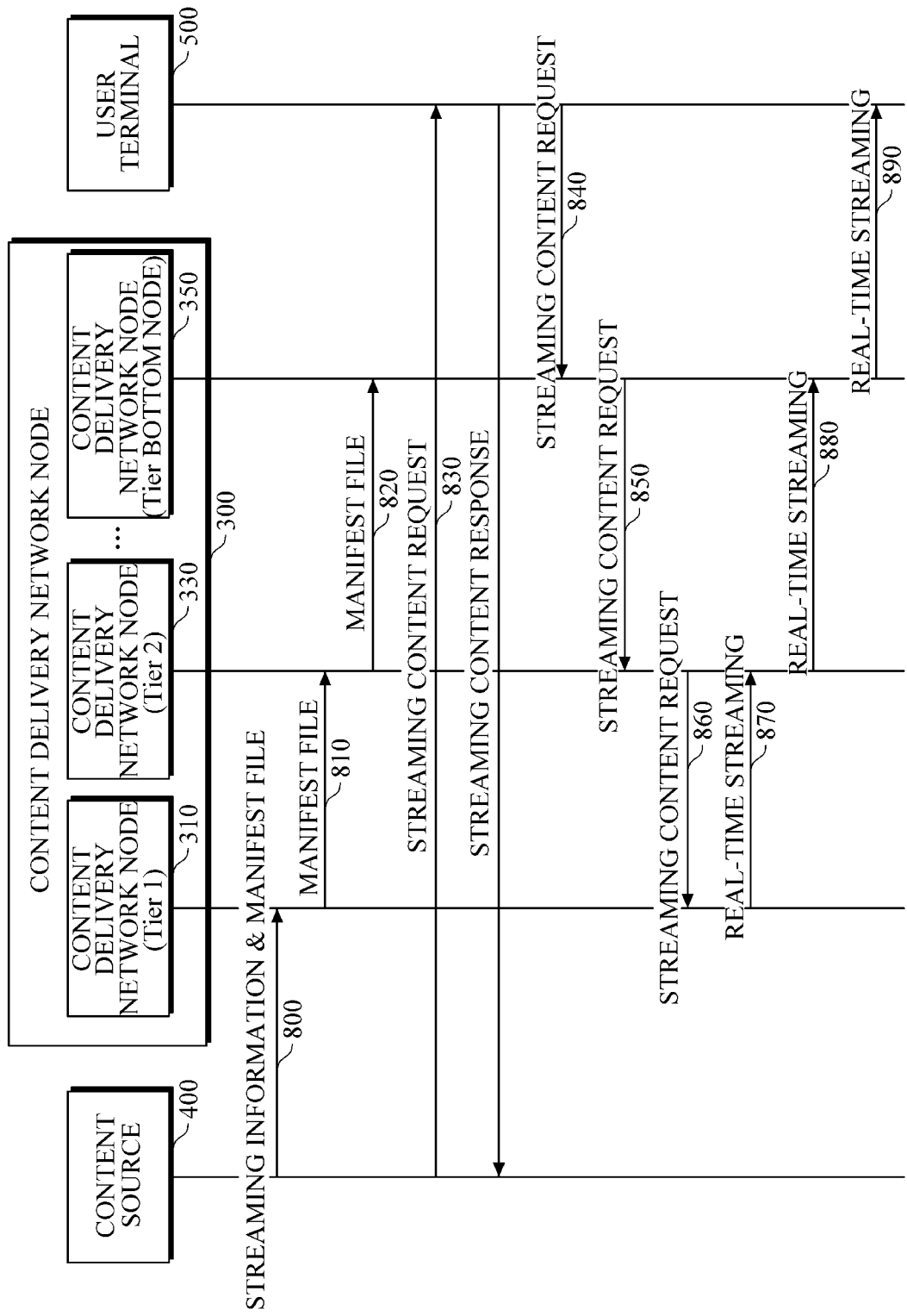

APPARATUS AND METHOD FOR CONFIGURING ON-DEMAND CONTENT DELIVERING OVERLAY NETWORK

CROSS-REFERENCE TO RELATED APPLICATION

This application claims the benefit under 35 U.S.C. §119(a) of Korean Patent Application No. 10-2012-0035676, filed on Apr. 5, 2012, the entire disclosure of which is incorporated herein by reference for all purposes.

BACKGROUND

1. Field

The following description relates to an apparatus and method for configuring a content delivery network, and more particularly, to a method and apparatus for configuring an overlay network to efficiently deliver and manage content.

2. Description of the Related Art

A general method for delivering content on the Internet is to deliver content files from a server containing desired content to a client terminal according to a request from the client terminal so that the client terminal can download the content files sent from the server. However, the method has a problem that it is difficult to estimate the time taken for downloading content files since the method is greatly dependent on the state of a network, and it takes a long time to download all the content files.

As a method for dramatically improving the performance of the Internet by improving Internet service quality and speed, a content delivery network has been developed. The content delivery network is a service for distributively delivering content using a plurality of local servers located at different sites on a network and a traffic management technology, in order to avoid a bottleneck that often occurs upon transmission of content. Internet service providers such as content providers can efficiently accommodate Internet users through a content delivery network system, and the Internet users can receive content at high speed using most appropriate servers.

Recently, with the activation of open multimedia services, such as a smart TV and a web TV, content and service providers themselves can provide services to user terminals, such as smart TVs, smart phones, etc., without the help of a network operator. However, since content delivery technology for such open multimedia services has not yet been developed, there are difficulties in providing extensible services to users.

Meanwhile, an overlay network is a virtual network having a virtual service routing function, which is configured on top of an existing physical network. In other words, the overlay network is a virtual network of nodes and logical links that is built on top of an existing transfer network. In the overlay network, since neighboring nodes are logically neighboring nodes, not physically neighboring nodes, it is possible to provide efficient network services by making the best use of an existing network.

SUMMARY

The following description relates to a technique of providing a content delivery overlay network for a predetermined time period by configuring the content delivery overlay network, allocating the content delivery overlay network to service and network providers, and allowing the service and content providers to use the content delivery overlay network, so that the content and service providers can distribute content to users through the content delivery overlay network, without help of a network operator.

In one general aspect, there is provided an apparatus for managing a content delivery network to transmit media content to a user, including: a request receiver configured to receive a network configuration request and network configuration information, from a service provider that provides the content, wherein the network configuration information is needed to provide a service of the service provider; a resource manager configured to manage resource information including information about available resources required for configuring the network; and a controller configured to configure a content delivery overlay network for configuring the content delivery network, based on the resource information and the network configuration information.

The controller may configure, if a plurality of network configuration requests are received from a plurality of service providers, at least one network using the network node.

The content delivery overlay network may be allocated for a predetermined time period required by the service provider, based on the network configuration information, and the content delivery overly network may be deleted when the predetermined time period elapses.

In another general aspect, there is provided a method of managing a content delivery network to transfer media content to a user, including: receiving a network configuration request and network configuration information, from a service provider that provides the content; receiving resource information including information about available resources required for configuring the network; and configuring a content delivery overlay network, based on the resource information and the network configuration information.

The method may further include, receiving, before receiving the network configuration request and the network configuration information, basic registration information including IP addresses of content delivery network nodes having an overlay network configuration function on the content delivery network.

The method may further include configuring, when a plurality of network configuration requests are received from a plurality of service providers, at least one network using a network node capable of being shared between the service providers.

The method may further include allocating, after the content delivery overlay network is configured, the content delivery overlay network for a predetermined time period required by the service provider, based on the network configuration information needed to provide a service of the service provider, and deleting the content delivery overlay network when the predetermined time period elapses.

Other features and aspects will be apparent from the following detailed description, the drawings, and the claims.

BRIEF DESCRIPTION OF THE DRAWINGS

FIG. 5 is a flowchart illustrating an example of a method of transmitting streaming content to a user terminal through a content delivery overlay network.

Figure 1:
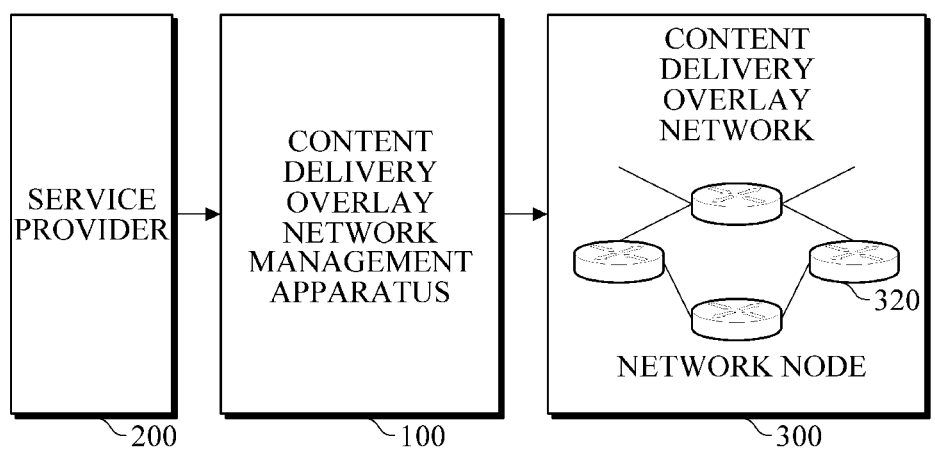
FIG. 1 is a diagram illustrating an example of a network system including a content delivery overlay network management apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be understandable to those of ordinary skill in the art. Also, descriptions of well-known functions and constructions may be omitted for increased clarity and conciseness.

FIG. 1 is a diagram illustrating an example of a network system including a content delivery overlay network management apparatus 100.

Referring to FIG. 1, the content delivery overlay network management apparatus 100 may receive basic registration information about nodes 320 (320 for each, also referred to as content delivery network nodes) having an overlay network configuration function, from a content delivery network. The basic registration information may be IP addresses or address information indicating physical or logical addresses on the network. The content delivery overlay network management apparatus 100 may register a list of the nodes 320 based on the basic registration information about the nodes 320, and store the list of the nodes 320. Also, the content delivery overlay network management apparatus 100 may perform a function of checking resource information including the performance and operation of the registered nodes 320 by accessing the nodes 320 periodically. The resource information may include information about whether or not each node operates, and information regarding utilization rates of the CPU, memory, and network interface of the node.

The content delivery overlay network management apparatus 100 may receive a network configuration request for configuring a content delivery overlay network 300 to provide content (including media) of a service provider 200, and content delivery overlay network configuration information to provide a service of the service provider 200, from the service provider 200. The content delivery overlay network configuration information, needed to provide a service of the service provider 200, may include a unique name of the content delivery overlay network 300, the IP address or URL of a manifest file including detailed information (name, location, size, etc.) about the content, information about a region over which a content delivery overlay network service is provided, information about times at which the content delivery overlay network service starts and ends, storage capacities allocated to the individual nodes 320 by the content delivery overlay network 300, a maximum bit rate of content transmitted by the content delivery overlay network 300, content aging settings of content that are distributed on the content delivery overlay network 300, and expected servicer users.

The content delivery overlay network management apparatus 100 may acquire resource information needed for configuring the content delivery overlay network 300, based on the content delivery overlay network configuration information, and configure a transfer path for the content delivery overlay network 300 based on the resource information.

Also, the content delivery overlay network management apparatus 100 may transfer node setting information to the individual nodes 320 located on the configured transfer path, based on the content delivery overlay network configuration information, wherein the node setting information includes information about ports for communications with upstream and downstream nodes of the content delivery overlay network 300, and information regarding a content delivery method.

Each content delivery overlay network node 320 may include a state providing unit that provides resource information including utilization rates of the CPU, memory, and network interface of the node 320, periodically, after the corresponding node 320 is registered, a port for communications with upstream and downstream nodes through the content delivery overlay network 300 according to a request from a controller, a setting controller that is in charge of node settings and configuration including a content delivery method, a data collector that collects content from content sources or other content delivery network nodes, a content storage unit that stores distributed content, an overlay multicast streamer for streaming distribution in a one-to-many way from a content delivery overlay network node to a plurality of content delivery overlay network nodes or to a plurality of user terminals, a content distribution unit that is used to deliver on-demand video content to a downstream node or a user terminal, and a content converter that is used to convert the format of content to be transmitted.

Meanwhile, the content delivery overlay network management apparatus 100 may allocate the content delivery overlay network 300 for a predetermined time period required by the service provider 200, based on the information about the time at which the content delivery overlay network service ends, included in the content delivery overlay network configuration information, and delete the content delivery overlay network 300 when the predetermined time period elapses.

Figure 2:
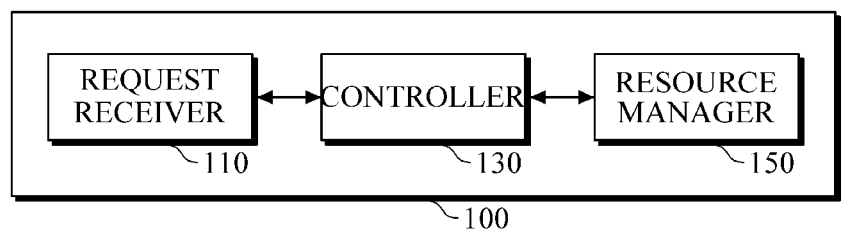
FIG. 2 is a diagram illustrating the content delivery overlay network management apparatus of FIG. 1.

FIG. 2 is a diagram illustrating the content delivery overlay network management apparatus 100 of FIG. 1.

Referring to FIGS. 1 and 2, the content delivery overlay network management apparatus 100 includes a request receiver 110, a controller 130, and a resource manager 150.

The request receiver 110 may receive a network configuration request and content delivery overlay network configuration information, from the service provider 200.

The content delivery overlay network configuration information is transferred to the controller 130. The controller 130 may analyze the content delivery overlay network configuration information, and request the resource manager 150 to send information about available network resources required for configuring an appropriate content delivery overlay network 300 based on the content delivery overlay network configuration information.

The resource manager 150 may receive basic registration information related to nodes 320 of the content delivery overlay network 300, the nodes 320 having an overlay network configuration function on the content delivery overlay network 300. The resource manager 150 may store or register a list of the nodes 320 based on the basic registration information, and also perform a function of checking or updating resource information about the nodes 320 by accessing the nodes 320 periodically.

Also, the resource manager 150 may receive a resource information request and content delivery overlay network configuration information from the controller 130, and transfer information of an available network resource allocation and an updated list of available resources to the controller 130.

The controller 130 may configure a transfer path of the content delivery overlay network 300 based on the list of available resources, and request the resource manager 150 to allocate network resources to the individual nodes 320 located on the transfer path. After the resource manager 150 allocates network resources to the individual nodes 320, the controller 130 may transfer node setting information to the individual nodes 320, based on the content delivery overlay network configuration information, in order to configure the content delivery overlay network 300.

After the controller 130 transfers the node setting information to the corresponding nodes 320 and configures the content delivery overlay network 300, the controller 130 may notify the request receiver 110 that the content delivery overlay network 300 has been configured or allocated.

Meanwhile, when a plurality of network configuration requests are received from a plurality of service providers 200, a network node 320 may be used to configure several content delivery overlay networks. That is, when a plurality of network configuration requests are received from a plurality of service providers 200, a content delivery overlay network 300 may be configured in correspondence to each network configuration request by using a network node 320 shared between the service providers 200. Each service provider 200 may provide a content providing service to user terminals through a network allocated to itself.

Figure 3:
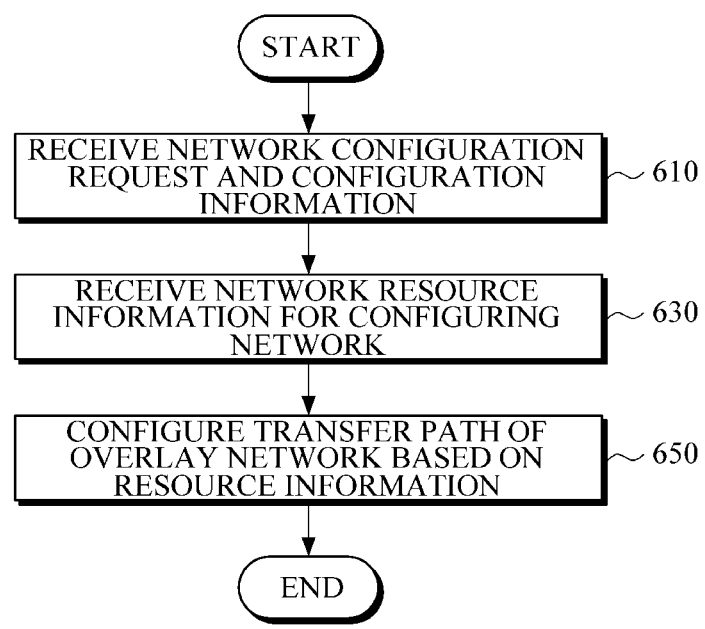
FIG. 3 is a flowchart illustrating an example of a method of configuring a content delivery overlay network.

FIG. 3 is a flowchart illustrating an example of a method of configuring a content delivery overlay network.

Referring to FIG. 3, in operation 610, a network configuration request for configuring a content delivery overlay network, and content delivery overlay network configuration information, required for providing a service of the service provider, are received from a service provider that provides content.

The content delivery overlay network configuration information may include a unique name of the content delivery overlay network, the IP address or URL of a manifest file including detailed information (name, location, size, etc.) about the content, information about a region over which a content delivery overlay network service is provided, information about times at which the content delivery overlay network service starts and ends, storage capacities allocated to the individual nodes by the content delivery overlay network, a maximum bit rate of content transmitted by the content delivery overlay network, content aging settings of content that are distributed on the content delivery overlay network, and expected service users.

Also, before the network configuration request and the content delivery overlay network configuration information are received from the service provider, basic registration information related to nodes of the content delivery overlay network, the nodes having an overlay network configuration function on the content delivery overlay network, may be received. The basic registration information may be IP addresses or address information indicating physical or logical addresses on the network. Then, a list of the nodes based on the basic registration information is registered and stored, and also, a function of checking resource information including the performance and operation of the registered nodes by accessing the nodes periodically may be performed. The resource information may include information about whether or not each node operates, and information regarding utilization rates of the CPU, memory, and network interface of the node.

Then, in operation 630, the content delivery overlay network configuration information is analyzed, and information about available resources is received from each content delivery overlay network node, in order to acquire information about available resources required for configuring the content delivery overlay network. Then, based on the information about available resources, a list of content delivery overlay network nodes with available resources is created.

Each content delivery overlay network node may provide resource information including utilization rates of the CPU, memory, and network interface of itself, periodically, decide a port for communication with upstream and downstream nodes of the network, and also perform node settings and configuration including a content transfer method.

Also, the content delivery overlay network node may collect content from content sources or other content delivery network nodes, and store the collected content. Also, the content delivery overlay network node may perform streaming distribution to a plurality of content delivery overlay network nodes or to a plurality of user terminals, in a one-to-many way, and convert the format of on-demand video content that are to be transmitted to a downstream node or a user terminal.

Then, in operation 650, a transfer path of the content delivery overlay network is configured based on the received resource information and the content delivery overlay network configuration information.

Successively, node setting information is transmitted to the individual nodes 320 located on the configured transfer path, based on the content delivery overlay network configuration information, wherein the node setting information includes information about ports for communications with upstream and downstream nodes of the content delivery overlay network, and information regarding a content delivery method.

Also, the content delivery overlay network is allocated for a predetermined time period required by the service provider, based on the information about the time at which the content delivery overlay network service ends, included in the content delivery overlay network configuration information, and the allocated content delivery overlay network is deleted when the predetermined time period elapses.

Meanwhile, when a plurality of network configuration requests are received from a plurality of service providers, a content delivery overlay network may be configured in correspondence to each network configuration request by using a network node shared between the service providers 200. Each service provider may provide a content providing service to user terminals through a network allocated to itself.

Figure 4:
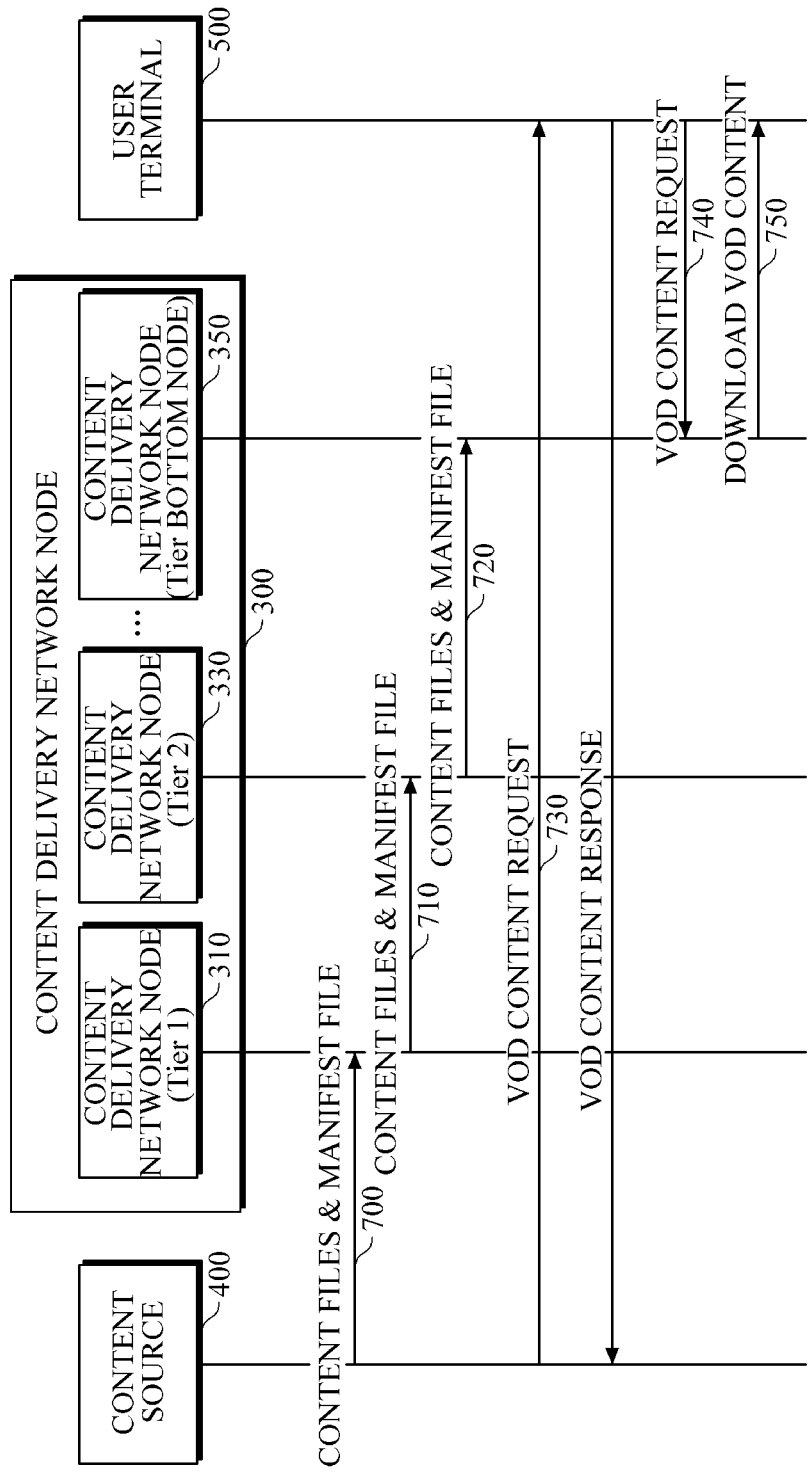
FIG. 4 is a flowchart illustrating an example of a method of transmitting on-demand video content to a user terminal through a content delivery overlay network.

FIG. 4 is a flowchart illustrating an example of a method of transmitting on-demand video content to a user terminal through a content delivery overlay network.

Referring to FIGS. 2 and 4, if the controller 130 configures a content delivery overlay network 300, a network node 310 decided as a top node by the controller 130 receives content files and a manifest file including information about the content from a content source 400 (700). Then, the top node 310 may analyze the manifest file to acquire information about the locations, sizes, etc. of the content files that are to be transmitted through the content delivery overlay network 300. Then, the top node 310 downloads the content, and thereafter the top node 310 may distribute the manifest file and the content files to its lower node 330. The manifest file and content files are distributed to the lower nodes sequentially until the manifest file and content files reach a bottom node 350 (710 and 720). After the manifest file and content files are completely distributed to all the nodes belonging to the content delivery overlay network 300, the process may wait until a content request is received from a user terminal 500. If a content request is received from the user terminal 500 (730 and 740), the requested content may be transferred to the user terminal 500 from the network node 350 to which the user terminal 500 belongs, in response to the content request, wherein the content request may be an address is connection method including a HTTP Redirection and a Domain Name System (DNS) (750).

FIG. 5 is a flowchart illustrating an example of a method of transmitting streaming content to a user terminal through a content delivery overlay network.

In the example of FIG. 5, content delivery overlay network configuration information may further include multicast addresses and port information. Referring to FIGS. 2, 4, and 5, the node 310 decided as a top node by the controller 130 may receive a manifest file including information related to real-time streaming, and streaming files, from the content source 400 (800).

The top node 310 may analyze the manifest file to acquire information about the locations, sizes, etc. of the streaming files that are to be transmitted through the content delivery overlay network 300. Then, the top node 310 downloads the content, and thereafter the top node 310 may distribute the manifest file and the content files to its lower node 330. The manifest file and content files are distributed to the lower nodes sequentially until the manifest file and content files reach the bottom node 350 (810 and 820). After the manifest file and content files are completely distributed to all the nodes belonging to the content delivery overlay network 300, the process may wait until a content request is received from the user terminal 500.

If a streaming content request is received from the user terminal 500 (830 and 840), the streaming content request may be transferred to the top node 310 from the bottom node 350 to which the user terminal 500 belongs, sequentially, (840, 850, and 860). When the top node 310 receives the streaming content request (860), the requested content may be transferred from the top node 310 to the bottom node 350, sequentially, (870 and 880) and the bottom node 350 may transfer the content to the user terminal 500 via streaming (890).

Therefore, according to the examples described above, by analyzing service request information from a content service provider, creating an overlay network with a required capacity, optimized for the corresponding service, and providing the overlay network for a required time period, the content service provider may provide service policies and reflect users' requirements as if its own unique network is built. Furthermore, by configuring a content delivery overlay network for each provider, service and content providers having no unique content delivery method of their own can provide multimedia services based on applications for smart TV and web TV to a plurality of users.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for managing a content delivery network to transmit media content to a user, the apparatus comprising:
   a request receiver configured to receive a network configuration request and network configuration information, from a service provider that provides the content, wherein the network configuration information is needed to provide a service of the service provider;
   a resource manager configured to manage resource information including information about available resources required for configuring the network; and
   a controller configured to set a plurality of network nodes for configuring a transfer path for content delivery in a content delivery overlay network, based on the resource information and the network configuration information, wherein the content is delivered from a content source to a user terminal via the network nodes along the configured transfer path.

2. The apparatus of claim 1, wherein the resource manager checks the resource information periodically and updates the resource information.

3. The apparatus of claim 1, wherein the content delivery overlay network is composed of at least one network node shared among a plurality of service providers.

4. The apparatus of claim 3, wherein the controller configures at least one network using the network node whenever a plurality of network configuration requests are received from a plurality of service providers.

5. The apparatus of claim 1, wherein the controller transfers content delivery overlay network node setting information to each network node, and wherein the content delivery overlay network node setting information includes information about a communication port and a content delivery method.

6. The apparatus of claim 1, wherein the content delivery overlay network is allocated for a predetermined time period required by the service provider, based on the network configuration information, and the content delivery overlay network is deleted when the predetermined time period elapses.

7. A method for managing a content delivery network to transfer media content to a user, the method comprising:
   receiving a network configuration request and network configuration information, from a service provider that provides the content;
   receiving resource information including information about available resources required for configuring the network; and
   setting a plurality of network nodes for configuring a transfer path for content delivery in a content delivery overlay network, based on the resource information and the network configuration information, the content being delivered from a content source to a user terminal via the network nodes along the configured transfer path.

8. The method of claim 7, further comprising:
   receiving, before receiving the network configuration request and the network configuration information, basic registration information including IP addresses of the network nodes having an overlay network configuration function.

9. The method of claim 7, further comprising:
   configuring at least one network node capable of being shared among the service providers whenever a plurality of network configuration requests are received from a plurality of service providers.

10. The method of claim 7, further comprising:
   transferring content delivery overlay network node setting information to each network node, wherein the content delivery overlay network node setting information includes information about a communication port and a content delivery method.

11. The method of claim 8, further comprising:
after receiving the basic registration information including the IP addresses of the content delivery network nodes, a utilization rate of a network interface of each node, and information about available resources, including memories, periodically accessing the nodes to update the resource information.

12. The method of claim 7, further comprising:
allocating the content delivery overlay network for a predetermined time period required by the service provider, based on the network configuration information needed to provide a service of the service provider, and deleting the content delivery overlay network when the predetermined time period elapses.

\* \* \* \* \*